(12) United States Patent
An et al.

(10) Patent No.: US 7,728,471 B2
(45) Date of Patent: Jun. 1, 2010

(54) METHOD OF MANUFACTURING TERMINAL ASSEMBLY OF ALTERNATOR FOR VEHICLES AND TERMINAL ASSEMBLY MANUFACTURED BY THE METHOD

(75) Inventors: Sang-Chul An, Daegu (KR); Il-Woo Ha, Daegu (KR); Jae-Jin Hyun, Daegu (KR)

(73) Assignee: Korea Delphi Automotive Systems Corporation, Daegu (KR)

( * ) Notice: Subject to any disclaimer, the term of this patent is extended or adjusted under 35 U.S.C. 154(b) by 588 days.

(21) Appl. No.: 11/593,983

(22) Filed: Nov. 6, 2006

(65) Prior Publication Data
US 2007/0103012 A1   May 10, 2007

(30) Foreign Application Priority Data
Nov. 10, 2005   (KR) ..................... 10-2005-0107432
Oct. 27, 2006   (KR) ..................... 10-2006-0105120

(51) Int. Cl.
*H02K 11/00* (2006.01)
(52) U.S. Cl. ..................................................... 310/71
(58) Field of Classification Search ............... 310/68 D, 310/68 R, 71
See application file for complete search history.

(56) References Cited

U.S. PATENT DOCUMENTS

| | | | | |
|---|---|---|---|---|
| 5,043,614 | A | * | 8/1991 | Yockey ...................... 310/68 D |
| 5,451,823 | A | * | 9/1995 | Deverall et al. .......... 310/68 D |
| 6,617,723 | B1 | | 9/2003 | Shichijyo |
| 6,825,586 | B2 | * | 11/2004 | Edrington .................... 310/71 |
| 6,828,703 | B2 | | 12/2004 | Einheuser et al. |
| 6,867,517 | B2 | | 3/2005 | Kumagai |

FOREIGN PATENT DOCUMENTS

| JP | 2003-136053 | 5/2002 |
|---|---|---|
| JP | 2003-274611 | 9/2003 |

* cited by examiner

*Primary Examiner*—Nguyen N Hanh
(74) *Attorney, Agent, or Firm*—Bachman & LaPointe, P.C.

(57) ABSTRACT

A method of manufacturing a terminal assembly of an alternator for vehicles and the terminal assembly manufactured by the method. The terminal assembly manufacturing method of the present invention includes a first step of notching and piercing a blank plate, a second step of deep-drawing notched portions of the plate to form a plurality of assembly protrusions, each of which has a pierced cylindrical shape protruding from the plate, a third step of trimming and piercing the plate to give it a predetermined shape, and a fourth step of coining and bending the plate, thus forming the terminal assembly.

3 Claims, 13 Drawing Sheets

FIGURE 1

Prior Art

FIGURE 2

Prior Art

FIGURE 3

Prior Art

METHOD OF MANUFACTURING TERMINAL ASSEMBLY OF ALTERNATOR FOR VEHICLES AND TERMINAL ASSEMBLY MANUFACTURED BY THE METHOD

BACKGROUND OF THE INVENTION

1. Field of the Invention

The present invention relates generally to terminal assemblies of alternators for vehicles and, more particularly, to a method of manufacturing a terminal assembly of an alternator for vehicles and a terminal assembly manufactured by the method, which includes a first step of notching and piercing a blank plate, a second step of deep-drawing the notched portions of the plate to form a plurality of assembly protrusions, each of which has a cylindrical shape that is open at opposite ends thereof and protrudes from the plate, a third step of trimming and piercing the plate to give it a predetermined shape, and a fourth step of coining and bending the plate, thus forming the terminal assembly, and in which the assembly protrusions are integrated together through a plastic molding process, so that, although the planar terminal assembly is relatively thin, its resistance to vertical or horizontal vibration is increased, compared to the conventional art.

2. Description of the Related Art

As well known to those skilled in the art, three-phase alternators, which are typically called alternators, have been widely used as generators for vehicles in order to increase the amount of voltage generated at low speed and to ensure stable performance at high speed. Such a three-phase alternator for a vehicle is coupled to a crank shaft of the engine of the vehicle by a belt and serves to charge a battery using power generated by the operation of the engine.

Figure 1:
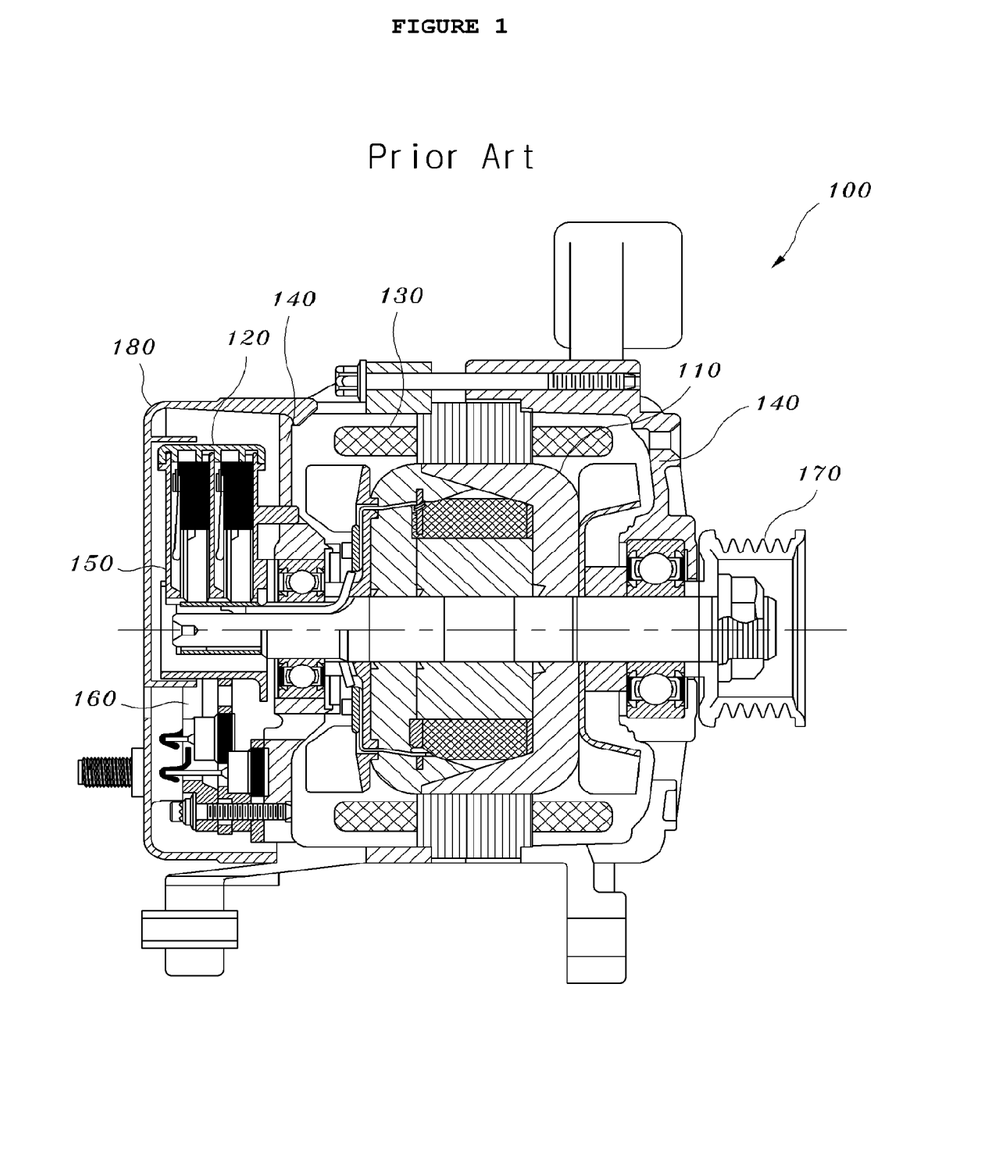
FIG. 1 is a sectional view showing a conventional alternator for vehicles.

FIG. 1 illustrates a representative alternator for vehicles. As shown in FIG. 1, the conventional alternator 100 includes a rotor assembly 110, which generates magnetomotive force, a brush assembly 120, which supplies electric current to the rotor assembly 110, a stator assembly 130, which generates induced electromotive force using the generated magnetomotive force, and housings 140 and 180, which support the above components at opposing positions. The alternator 100 further includes a regulator 150, which adjusts the intensity of a rotor system, a rectifier assembly 160, which rectifies AC to DC, and a pulley 170, which receives rotating force from the outside (the engine).

Figure 2:
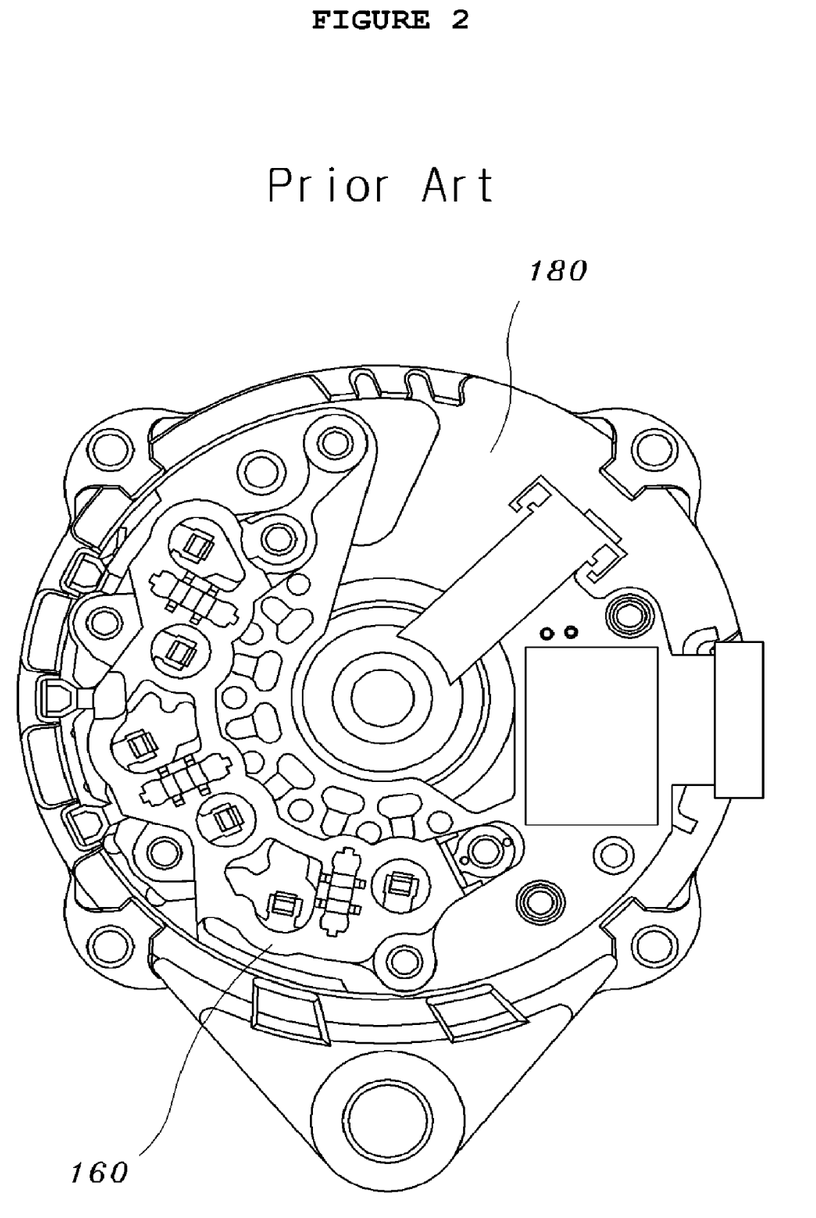
FIG. 2 is a side view showing the conventional alternator for vehicles.
Figure 3:
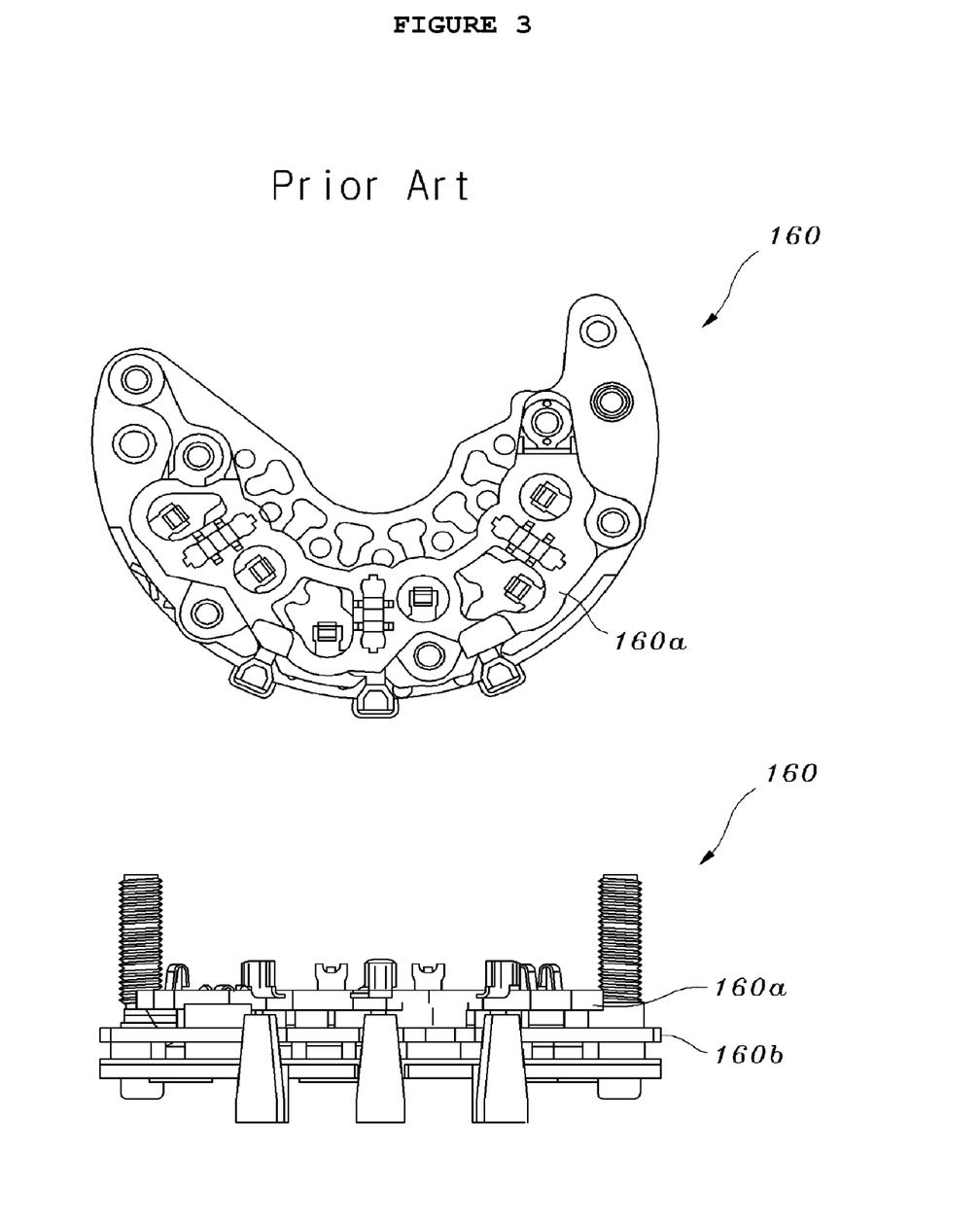
FIG. 3 is a plan view and a side view showing a rectifier assembly of the conventional alternator.

As shown in FIGS. 2 and 3, the rectifier assembly 160, which is provided in the housing 180, has a structure such that a terminal assembly 160a, to which a diode lead wire and a stator lead wire are connected, and a heat sink 160b for heat dispassion, are stacked to have a stacked plate shape.

However, because the terminal assembly having a planar plate shape must be bent to connect the diode lead wire or the stator lead wire to the terminal assembly, fatigue fracture occurs at the bent portions of the terminal assembly due to vibration. In addition, there is a problem in that the diode lead wire is bent during the assembly process so that the assembly of the diode lead wire with the terminal assembly becomes unstable.

Furthermore, because the terminal assembly has the bent shape, the process of manufacturing the terminal assembly and the shape thereof are complex. In addition, for the above reasons, the terminal assembly has poor resistance to vibration. To reinforce the terminal assembly, the thickness of the terminal assembly must be increased. This results in a problem of increasing the costs of manufacturing the terminal assembly.

SUMMARY OF THE INVENTION

Accordingly, the present invention has been made keeping in mind the above problems occurring in the prior art, and an object of the present invention is to provide a method of manufacturing a terminal assembly of an alternator for vehicles and the terminal assembly manufactured by the method, the method including a first step of notching and piercing a blank plate, a second step of deep-drawing notched portions of the plate to form a plurality of assembly protrusions, each of which has a cylindrical shape that is open at opposite ends thereof and protrudes from the plate, a third step of trimming and piercing the plate to have a predetermined shape, and a fourth step of coining and bending the plate, thus forming the terminal assembly.

In order to accomplish the above object, the present invention provides a method of manufacturing a terminal assembly of a rectifier assembly of an alternator for vehicles, the terminal assembly is connected to a diode lead wire and a stator lead wire. The terminal assembly manufacturing method includes a first step of notching and piercing a blank plate; a second step of deep-drawing notched portions of the plate to form a plurality of assembly protrusions, each having a cylindrical shape that is open at opposite ends thereof and protrudes from the plate; a third step of trimming and piercing the plate to realize a predetermined shape; and a fourth step of coining and bending the plate, thus forming the terminal assembly.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

Figure 4:
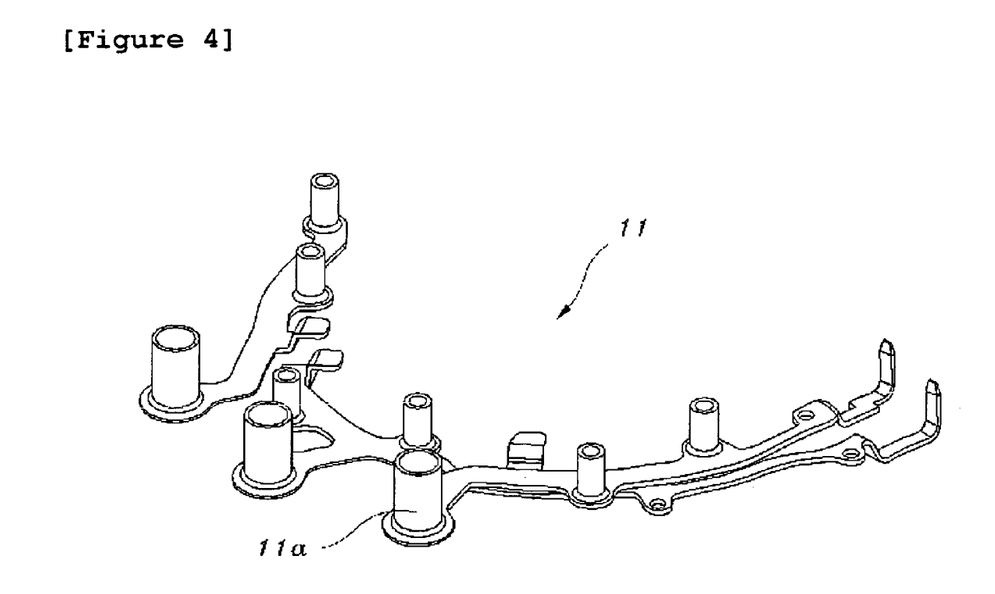
FIG. 4 is a perspective view of a terminal assembly of an alternator for vehicles, according to an embodiment of the present invention.
Figure 5A:
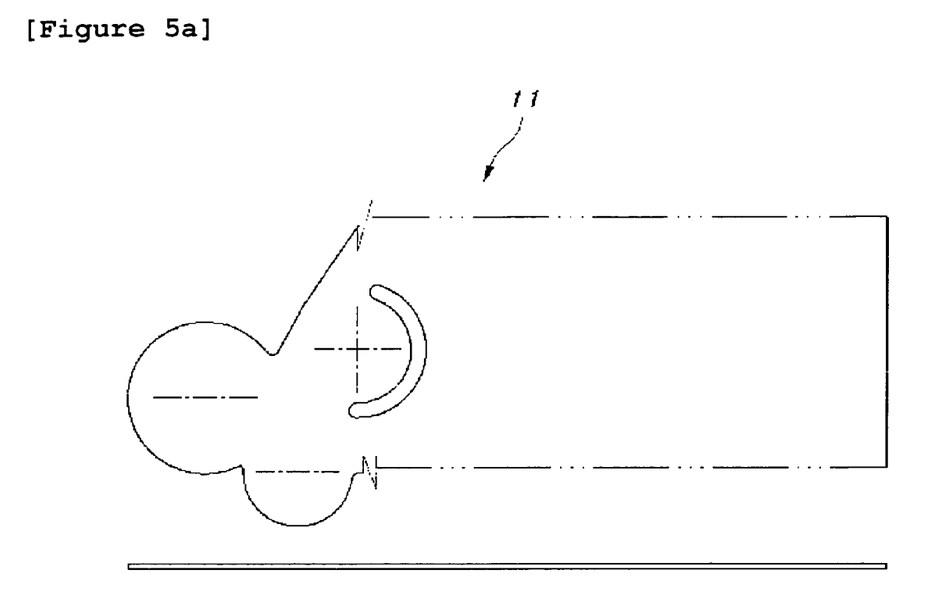
FIG. 5a is a plan view and a side view illustrating a first step of a method of manufacturing a terminal assembly, according to the present invention.
Figure 5B:
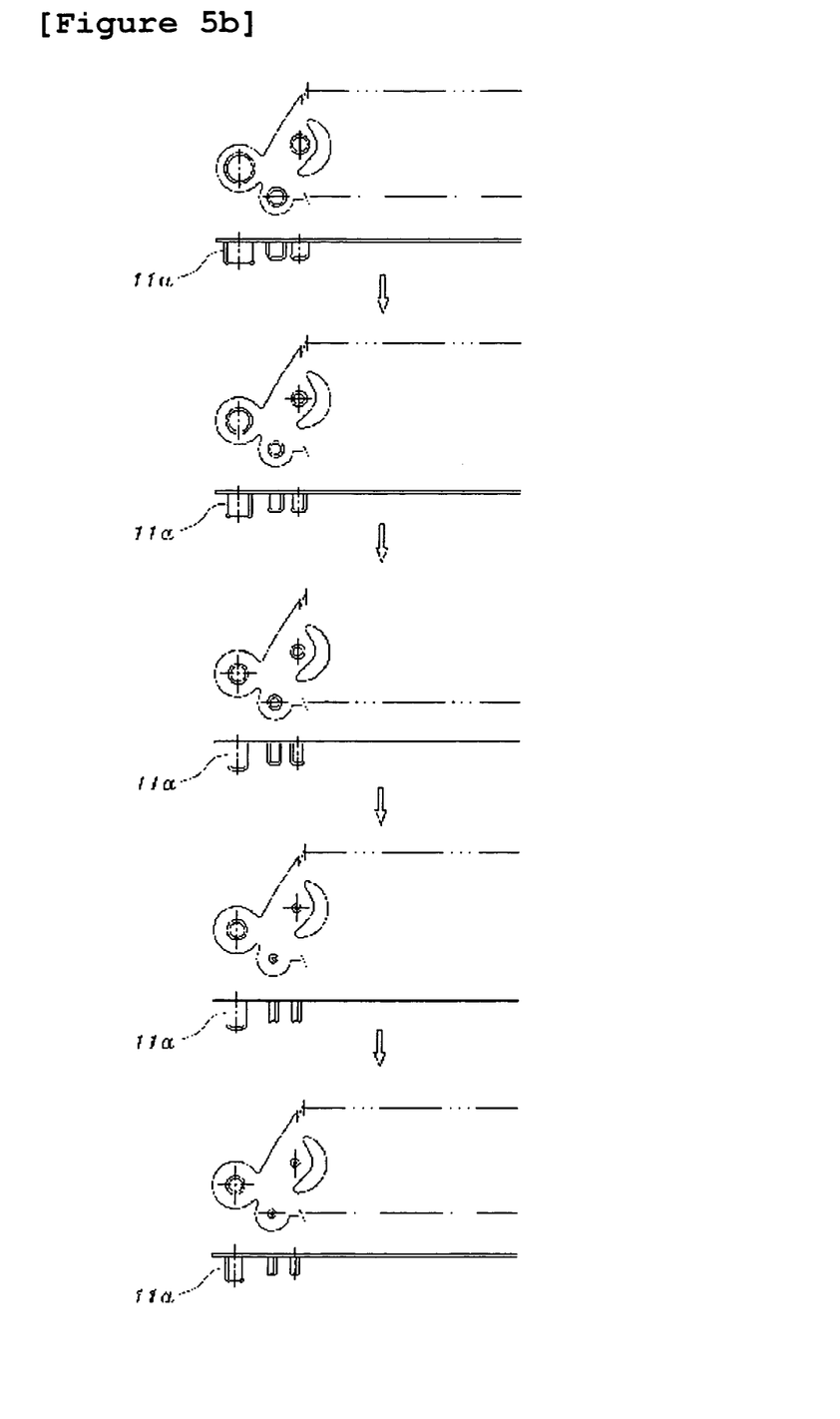
FIG. 5b is plan views and side views illustrating a second step of the terminal assembly manufacturing method according to the present invention.
Figure 5C:
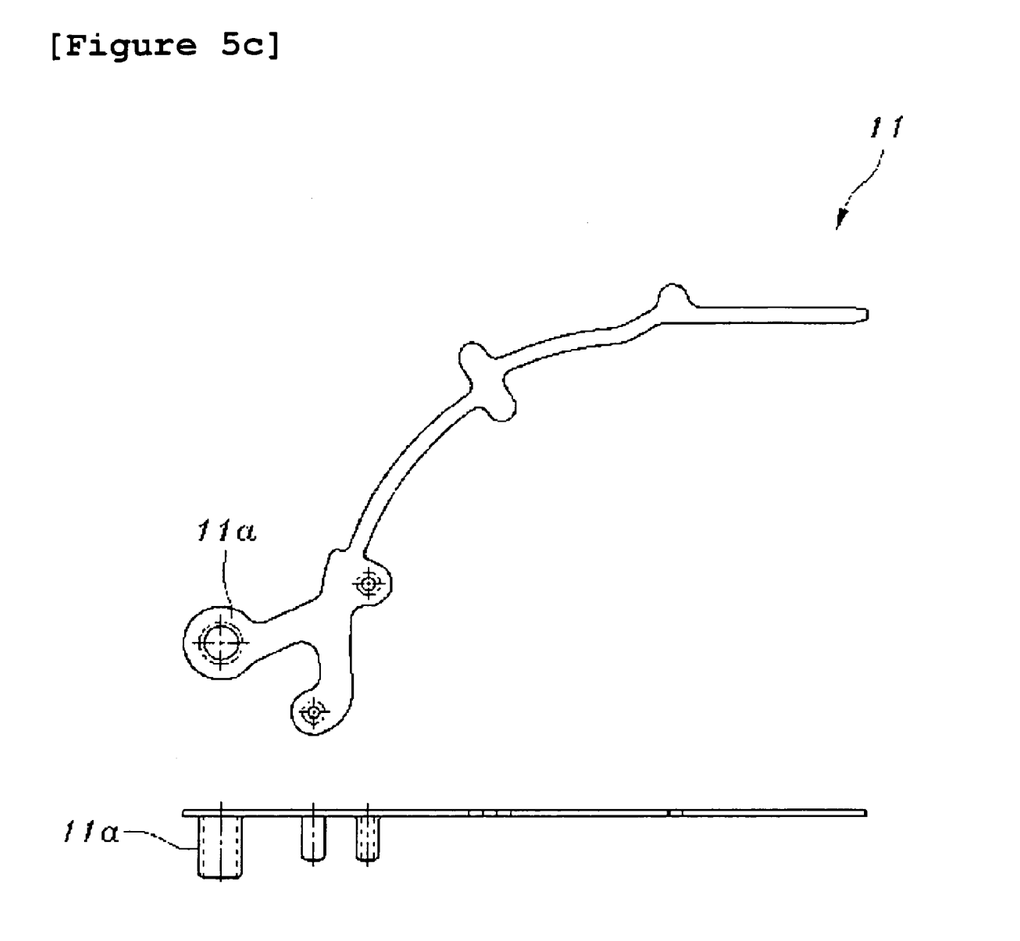
FIGS. 5c and 5d are plan views and side views illustrating a third step of the terminal assembly manufacturing method according to the present invention.
Figure 5D:
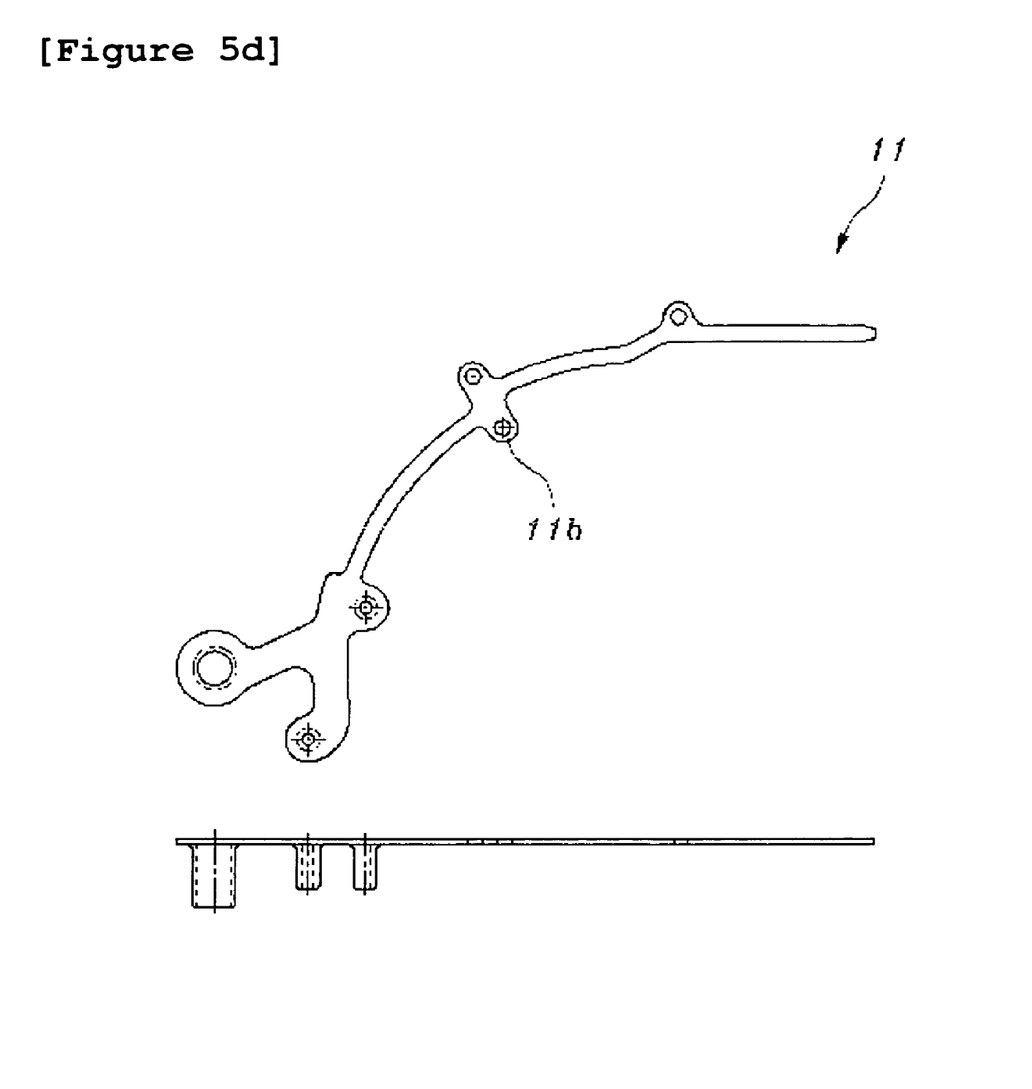
Figure 5E:
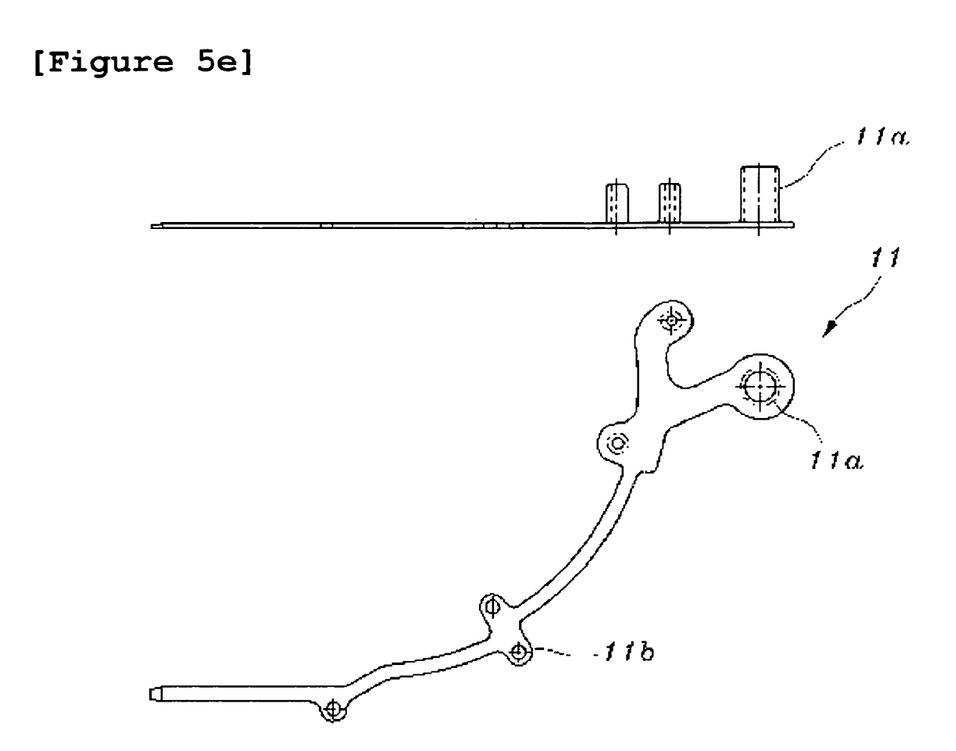
FIG. 5e and 5f are plan views and side views illustrating a fourth step of the terminal assembly manufacturing method according to the present invention.
Figure 5F:
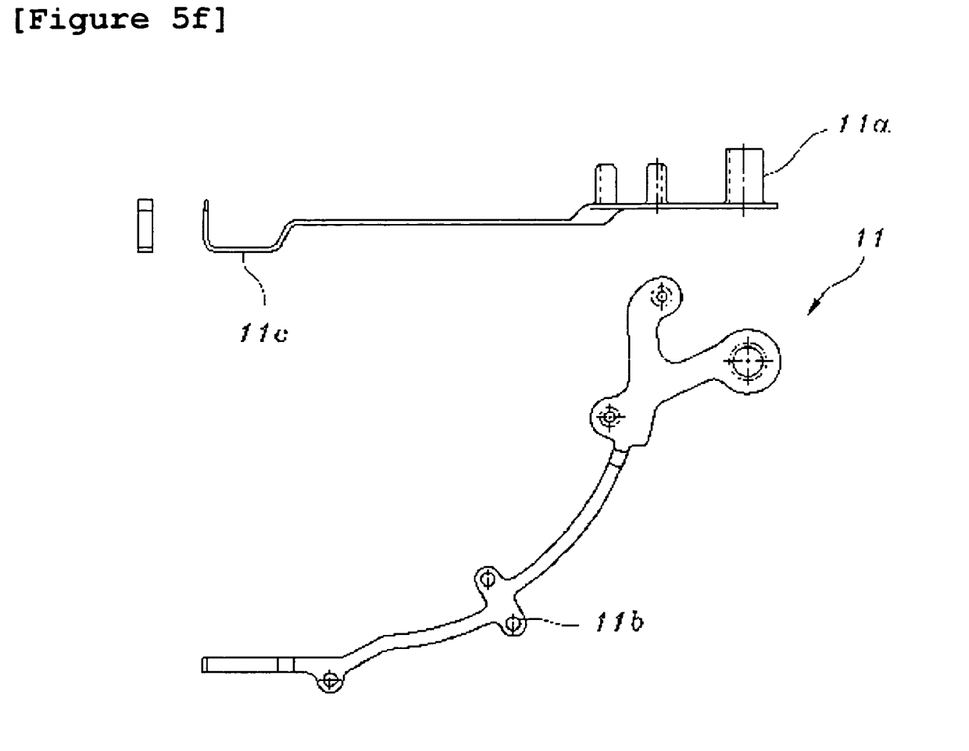
Figure 6:
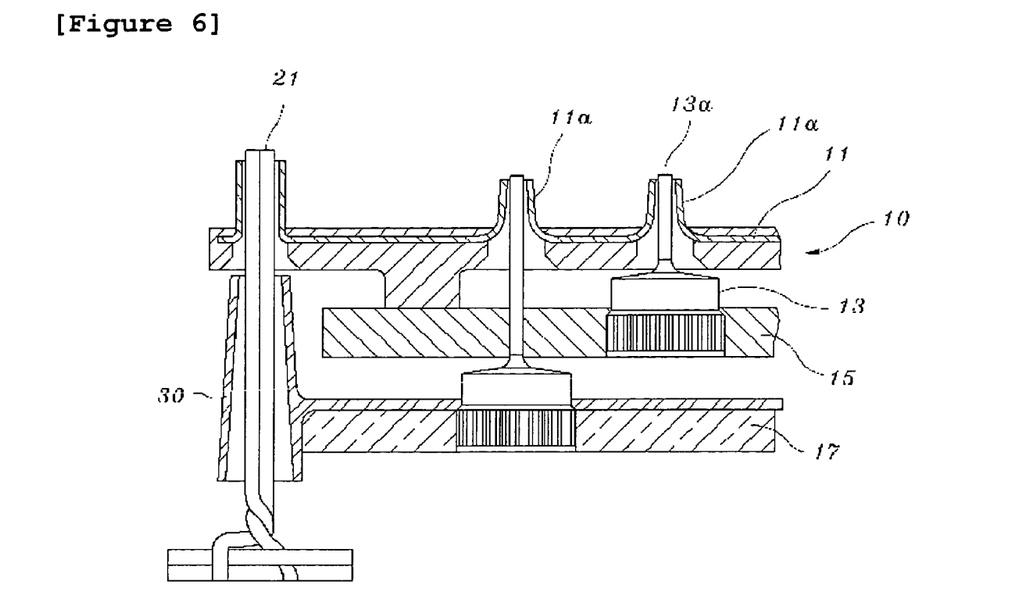
FIG. 6 is a partial sectional view showing a rectifier assembly of the alternator according to the present invention.
Figure 7:
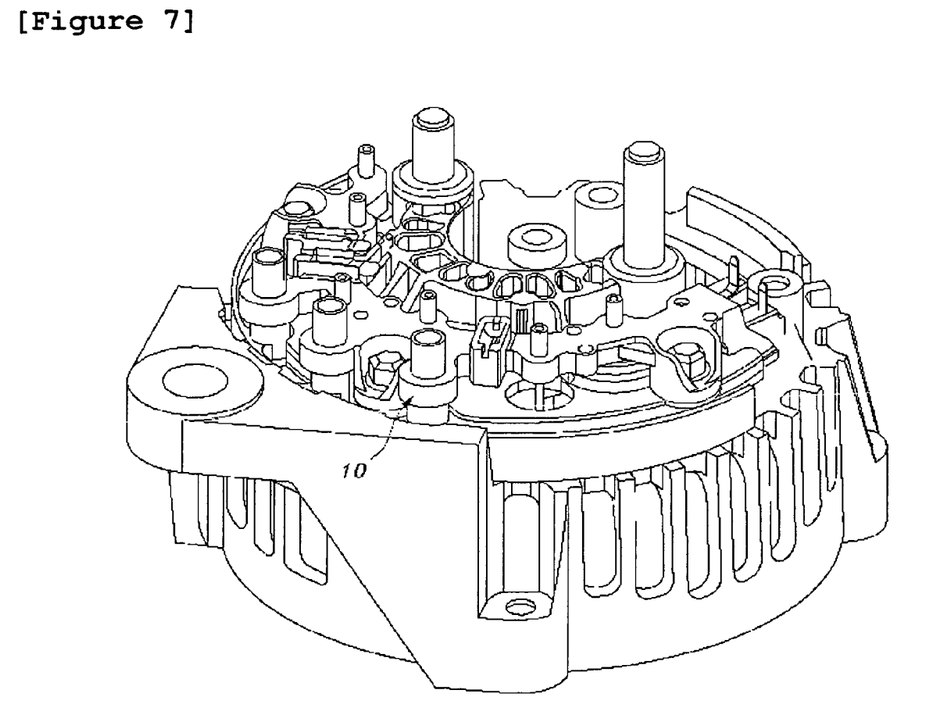
FIG. 7 is a perspective view of the rectifier assembly mounted to the alternator according to the present invention.
Figure 8:
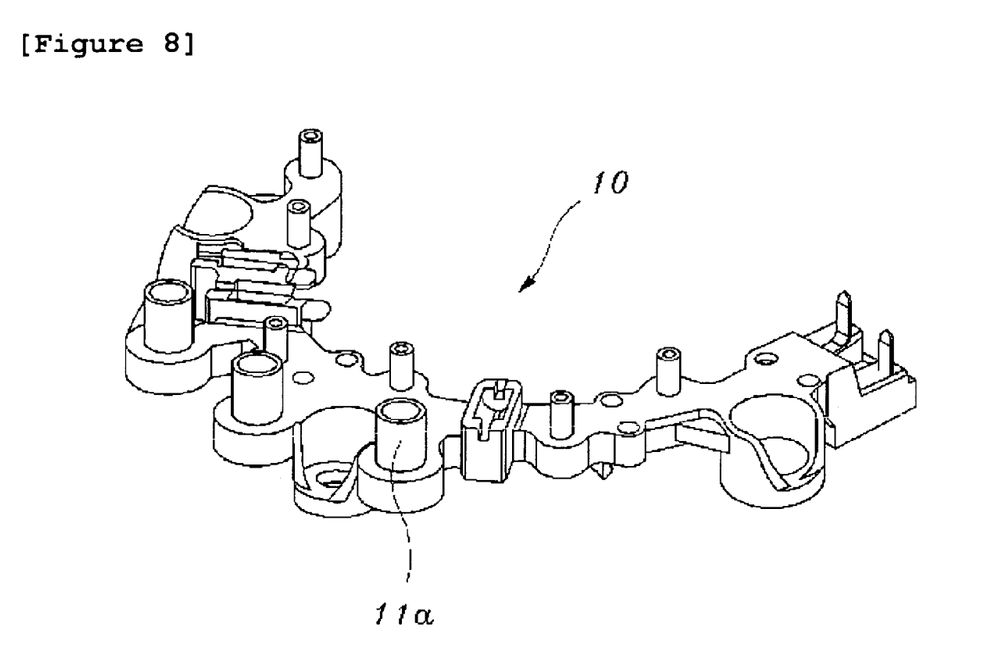
FIG. 8 is a perspective view of the rectifier assembly of the alternator according to the present invention.

FIG. 4 is a perspective view of a terminal assembly of an alternator for vehicles, according to an embodiment of the present invention. FIG. 5a is a plan view and a side view illustrating a first step of a method of manufacturing a terminal assembly, according to the present invention. FIG. 5b is plan views and side views illustrating a second step of the terminal assembly manufacturing method according to the present invention. FIGS. 5c and 5d are plan views and side views illustrating a third step of the terminal assembly manufacturing method according to the present invention. FIG. 5e and 5f are plan views and side views illustrating a fourth step of the terminal assembly manufacturing method according to the present invention. FIG. 6 is a partial sectional view showing a rectifier assembly of the alternator according to the present invention. FIG. 7 is a perspective view of the rectifier assembly mounted to the alternator according to the present invention. FIG. 8 is a perspective view of the rectifier assembly according to the present invention.

The present invention provides a method of manufacturing the terminal assembly 11 of the rectifier assembly 10 of the alternator which has a plate shape and is connected to diode lead wires 13a and a stator lead wire 21. The terminal assembly manufacturing method of the present invention includes the first step of notching and piercing a blank plate, and the second step of deep-drawing notched portions of the plate to form a plurality of assembly protrusions 11a, each of which has a cylindrical shape that is open at opposite ends thereof and protrudes from the plate. The terminal assembly manufacturing method further includes the third step of trimming and piercing the plate to have a predetermined shape, and the fourth step of coining and bending the plate, thus forming the terminal assembly.

In detail, as shown in FIG. 5a, at the first step, "+"-shaped marks are formed at predetermined positions on the thin blank plate for the terminal assembly 11 through the notching process, and a ")" shape is formed at a predetermined position through the blank plate through the piercing process.

As shown in FIG. 5b, at the second step, the "+"-shaped portions of the terminal assembly 11, which have been formed at the first step, are formed to protrude in one direction by the deep-drawing process, which comprises five steps, so that the assembly protrusions 11a, each of which is reduced in diameter from the plate to an end thereof, are formed.

At this time, in a final step of the five steps of the deep-drawing process, the ends of the assembly protrusions 11a are bored, such that the diode lead wires 13a and the stator lead wire 21 can be inserted through and coupled to the associated assembly protrusions 11a.

As shown in FIGS. 5c and 5d, at the third step, unnecessary portions are removed from the plate for the terminal assembly 11 through the trimming process to provide a shape suitable for assembly of the terminal assembly 11 with the rectifier assembly 10 (see, FIG. 5c), and a plurality of through holes 11b is formed at predetermined positions in the plate for the terminal assembly 11 through the piercing process (see, FIG. 5d).

As shown in FIG. 5e and 5f, at the fourth step, the coining process, in which an end of the plate for the terminal assembly 11 is formed into a point (see, FIG. 5e), and the bending process, in which the pointed end of the plate is bent such that a bending part having a predetermined length is formed, are conducted, thus completing the terminal assembly 11.

In the terminal assembly manufacturing method of the present invention comprising the above-mentioned first through fourth steps, each of the assembly protrusions 11a of the terminal assembly 11 may be formed into a conical shape as well as into a cylindrical shape. Furthermore, after the stator lead wire 21 and the diode lead wires 13a are inserted through the associated assembly protrusions 11a, the assembly protrusions 11a are integrated together through a plastic molding process, thus forming the rectifier assembly 10. Therefore, despite being relatively thin, the ability of the planar terminal assembly 11 to withstand vibration is increased, so that there is an advantage in that manufacturing costs thereof are reduced.

In addition, the number of defective diodes caused by the bending of the diode lead wire 13a during the manufacturing process can be minimized.

Furthermore, the diode lead wires 13a may be integrated with the terminal assembly 11 through a TIG welding, spot welding or soldering process.

Meanwhile, as shown in FIG. 4, the terminal assembly 11 to be manufactured by the above-mentioned terminal assembly manufacturing method has a thin semicircular plate shape. The assembly protrusions 11a, each of which has a cylindrical shape and is open at opposite ends thereof, protrude upwards on the terminal assembly 11 at predetermined positions at which the diode lead wires 13a and the stator lead wire 21 are connected to the terminal assembly 11.

Here, the assembly protrusions 11a of the terminal assembly 11 are formed to have cylindrical shapes through the deep drawing process.

Furthermore, each assembly protrusion 11a of the terminal assembly 11 may be formed to have a conical shape, which is open at opposite ends thereof and protrudes upwards from the terminal assembly 11.

Meanwhile, as shown in FIGS. 6 through 8, the rectifier assembly 10 is formed with the terminal assembly 11 such that the assembly protrusions 11a extend outside the rectifier assembly 10. Furthermore, the stator lead wire 21 passes through an insulator 30 for insulation and is inserted into the associated assembly protrusion 11a that protrudes outside the rectifier assembly 10.

In addition, the diode lead wires 13a of diodes 13, which are respectively inserted into positive heat sink 15 and negative heat sink 17, are inserted through the respective assembly protrusions 11a.

When the diode lead wires 13a are inserted into the lower ends (as seen in the view of FIG. 6) of the respective conical assembly protrusions 11a of the terminal assembly 11, because the diameter of the lower end of each assembly protrusion 11a is larger than that of the upper end thereof, the diode lead wire 13a can be easily and correctly guided and inserted into the associated assembly protrusion 11a.

Therefore, the present invention can markedly reduce the number of defective diodes caused by the bending or breaking of the diode lead wire 13a when the diode lead wire 13a is inserted into the associated assembly protrusion 11a.

Furthermore, the stator lead wire 21 and the diode lead wires 13a are more reliably fastened to the associated assembly parts 11a by clamping the assembly parts 11a. In addition, because space in each assembly protrusion 11a is ensured, an additional welding or soldering process can be easily conducted.

As well, in the present invention, the diode lead wires 13a are inserted into the associated assembly protrusions 11a of the terminal assembly 11 and are integrated with the terminal assembly 11 through a TIG welding, spot welding or soldering process. Therefore, the present invention has an advantage of increased resistance to vertical or horizontal vibration, compared to the conventional art.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

As described above, the present invention provides a method of manufacturing a terminal assembly of an alternator for vehicles and the terminal assembly manufactured by the method, which includes a first step of notching and piercing a blank plate, a second step of deep-drawing notched portions of the plate to form a plurality of assembly protrusions, each of which has a pierced cylindrical shape protruding from the plate, a third step of trimming and piercing the plate to give it a predetermined shape, and a fourth step of coining and bending the plate, thus forming the terminal assembly. In the terminal assembly manufactured by the method, the assembly protrusions, which are made of conductive material such as copper, and into which diode lead wires and a stator lead wire are inserted, have cylindrical or conical shapes and are integrated together through a plastic molding process. Therefore, although the planar terminal assembly is relatively thin, its resistance to vibration is increased, thus reducing the manufacturing costs thereof. Furthermore, the present invention can markedly reduce the number of defective diodes caused by the bending or breaking of the diode lead wire during the diode lead wire assembly process.

As well, in the present invention, the diode lead wires are inserted into the associated assembly protrusions of the terminal assembly and are integrated with the terminal assembly through a TIG welding, spot welding or soldering process. Therefore, the present invention has an advantage of increased resistance to vertical or horizontal vibration, compared to the conventional art.

What is claimed is:

1. A terminal assembly of an alternator for vehicles, the terminal assembly comprising:
a semicircular shaped plate, said semicircular shaped plate having a plurality of spaced apart protrusions each of which have a cylindrical shape which defines a through passage and which protrude in one direction from the semicircular shaped plate, wherein a first of the plurality of spaced apart protrusions defines a through passage of a height ($h_1$) and having a diameter ($d_1$) and a second of the plurality of spaced apart protrusions defines a through passage of a height ($h_2$) and having a diameter ($d_2$), wherein ($h_1$) is greater than ($h_2$) and ($d_1$) is greater than ($d_2$), wherein the first protrusion receives a stator lead wire and the second protrusion receives a diode lead wire and wherein the diode lead wire and the stator lead wire are connected to the terminal assembly.

2. The terminal assembly as set forth in claim 1, wherein the diode lead wire is fastened to and integrated with the terminal assembly by one of TIG welding, spot welding and soldering.

3. The terminal assembly as set forth in claim 2, wherein each of the protrusions has a conical shape.

* * * * *